United States Patent [19]
Nardi

[11] Patent Number: 4,612,088
[45] Date of Patent: Sep. 16, 1986

[54] REACTOR TO PERFORM CHEMICAL REACTIONS WITH A DISINTEGRATING DISC

[75] Inventor: Franco Nardi, Stockholm, Sweden

[73] Assignee: Sunds Defibrator AB, Stockholm, Sweden

[21] Appl. No.: 668,375

[22] PCT Filed: Mar. 18, 1983

[86] PCT No.: PCT/SE83/00100
§ 371 Date: Oct. 2, 1984
§ 102(e) Date: Oct. 2, 1984

[87] PCT Pub. No.: WO84/03724
PCT Pub. Date: Sep. 27, 1984

[51] Int. Cl.⁴ .................. D21B 1/14; D21C 7/10; D21C 7/14
[52] U.S. Cl. .................. 162/235; 162/65; 162/236; 162/243; 162/250; 241/46.11; 241/46.17; 422/205
[58] Field of Search .................. 162/26, 65, 57, 234, 162/235, 236, 246, 24, 25, 243, 250; 261/93; 241/46.11, 46.17; 422/202, 205, 228

[56] References Cited

U.S. PATENT DOCUMENTS

| | | | |
|---|---|---|---|
| 885,851 | 4/1908 | Kennedy | 162/57 |
| 1,849,866 | 3/1932 | Roza, Sr. | 162/250 |
| 2,973,153 | 2/1961 | Rich | 241/46.17 |
| 3,145,936 | 8/1964 | Monks | 241/46.17 |
| 3,774,853 | 11/1973 | Seifert | 241/46.11 |
| 4,172,877 | 10/1979 | Schwaig | 422/205 |
| 4,422,580 | 12/1983 | Shepherd et al. | 241/46.17 |
| 4,460,132 | 7/1984 | Thumm et al. | 162/261 |

FOREIGN PATENT DOCUMENTS

| | | |
|---|---|---|
| 93037 | 12/1896 | Fed. Rep. of Germany . |
| 892416 | 7/1951 | Fed. Rep. of Germany . |
| 1028874 | 12/1953 | Fed. Rep. of Germany . |
| 1076484 | 2/1958 | Fed. Rep. of Germany . |
| 171624 | 9/1953 | Sweden . |

Primary Examiner—Steve Alvo
Attorney, Agent, or Firm—Eric Y. Munson

[57] ABSTRACT

The present invention provides a reactor adapted to simultaneously accomplish chemical reactions and operations of size reduction of the solid materials in suspension and particularly for treatment in the cellulose and/or paper pulp industry. The reactor provides an essentially closed working environment and is provided in the lower part with a rotor which creates turbulence with flows over essentially the whole volume of the closed environment and is adapted to realize said conditions of the size reduction of solid materials with intimate mixing of same with the suspending liquid.

5 Claims, 8 Drawing Figures

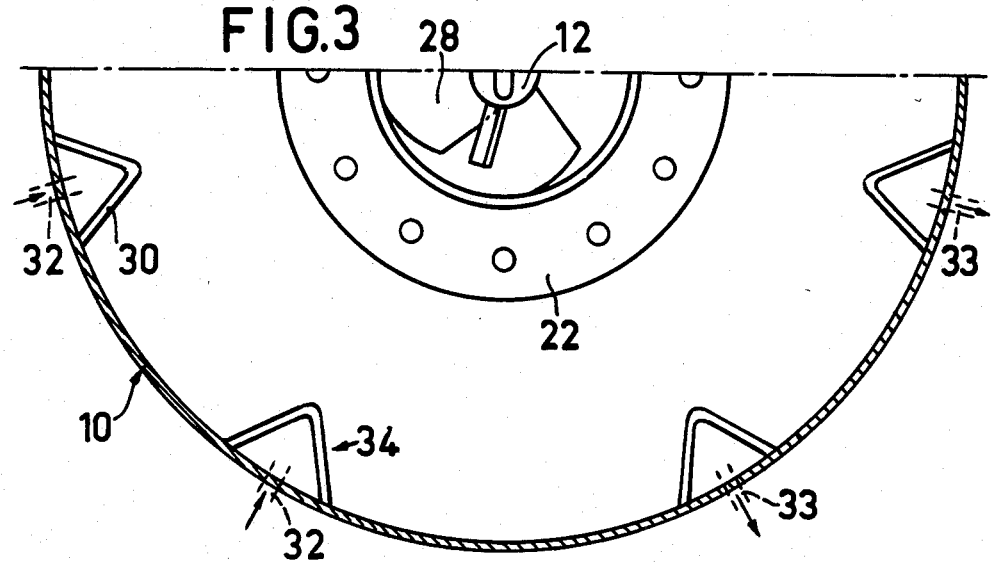
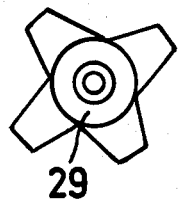
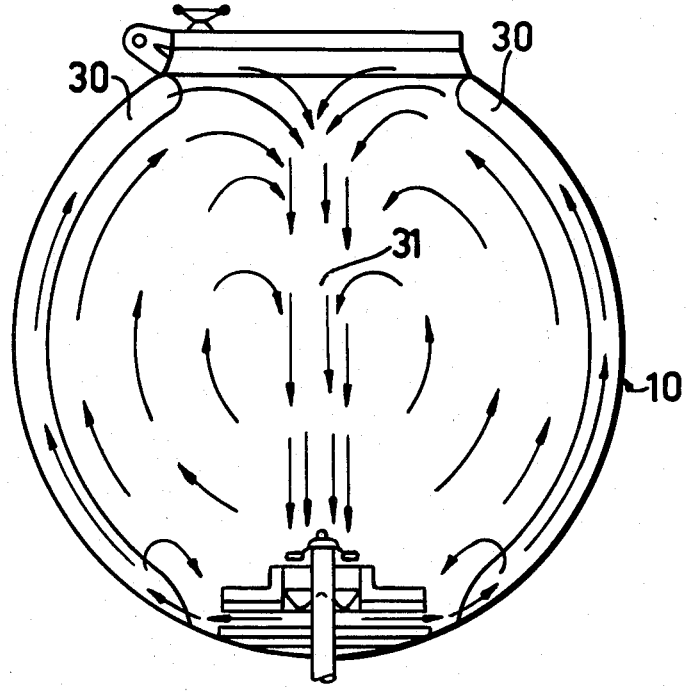

REACTOR TO PERFORM CHEMICAL REACTIONS WITH A DISINTEGRATING DISC

BACKGROUND OF THE INVENTION

The present invention concerns a reactor which permits simultaneous chemical reactions and operations of size reduction of the solid materials in suspension.

Particularly, the invention relates to a reactor suited for the mentioned operations and named "TURBOPULPER", adapted particularly for treatment in the cellulose and/or paper pulp industries. This reactor has an axial admission rotor with a radial delivery such as to create a turbulence inside the reactor. This reactor is preferably adapted to operate under pressure and has a spherical shape and may be heated (FIG. 1 and 2).

The present invention relates to a reactor for effecting chemical reactions simultaneously with operations of size reduction of solid materials in suspension,. Such a reactor is particularly usable but not exclusively, for example in the alkali-oxygen process for delignification.

As known, generally the chemical reactions are activated by a good mixing and by adequated temperatures. The reaction is still more active when conditions are created for a good "exchange of materials". Amongst these last conditions, there is the maximum possible exchange surface and interchange of the substances which must react along this surface. The general conditions summarized above are particularly difficult to attain in cases when the solid materials in suspension for the reaction are at high consistency in water or other liquid vehicles.

SUMMARY OF THE INVENTION

Particularly, these conditions must be reached in two separate apparatus operating in the pulp industry and called pulper and digester. The equipment referred to this invention provides for both these operations previously carried out in this industry by the aforesaid separate apparatuses. These apparatuses generally are not capable in the conditions to completely satisfy all the requirements of the particular applications and to have at the same time the necessary flexibility to reach the optimum or nearest to optimum working conditions with the treated materials of different characteristics.

Therefore, among the objects of the present invention is to provide a new reactor for the aforesaid uses, permitting under the mentioned conditions activation and speeding up of the chemical reactions, assuring that their effect is distributed extremely homogeneously throughout the reaction mass.

Particularly, one object of the present invention is to provide a reactor, as mentioned above, which simultaneously presents the following advantages:

(a) capability to reduce the size of the particles of the solid matters in suspension to the desired level;

(b) homogeneous distribution of chemicals throughout the mass, simultaneously with the size reduction of the solid materials in sus- pension;

(c) complete recycling of the contents of the reactor inside its spherical interior so that the material passes at every cycle at least one inlet zone of the chemicals fed in continuously; and (d) possibility of indirect heating, i.e., the heating medium is not mixed with the suspension to be heated, and without the well known inconveniences deriving from the formation of deposits of the suspended materials on the hot surface and thus maintaining a high constant coefficient of heat exchange independently from the type of suspension.

According to the invention, these and other objects are realized due to the fact that the reactor provides an essentially closed environment of treatment, where, in the lower zone, a rotor preferably with axial admission and radial delivery creates a turbulence with flows normally over the whole volume of the closed environment and at the same time, performs also the said size reduction of the solid materials mixing them intimately with the suspending liquor. The closed environmnet, as defined by the reactor, may advantageously be put under a super-atmospheric pressure. The reactor is of an essentially spherical shape and is heated indirectly, for example by means of steam.

The presence of the mentioned rotor, operating as aforesaid creates a turbulent motion depending on the choice of the structure and working characteristics of the rotor, to obtain the desired size reduction of the solid particles in suspension, optimizing the reaction conditions. The turbulence furthermore cooperates to distribute homogeneously the chemicals, which are fed near the rotor, throughout the mass.

For some treatments, the best operative conditions are realized when the reactor is put under super-atmospheric pressure and is of an essentially spherical shape. This configuration is of particular importance inasmuch as simultaneously the following objectives are achieved:

(a) to obtain the minimum possible ratio between the reactor's surface and its useful volume, reducing the overall dimensions;

(b) to reduce to the utmost the thickness of the walls of the reactor especially in the case when operating under pressure and consequent reduction of the weight and cost of the equipment;

(c) to realize, downstreams of the turbulent motion phase created near the rotor, guided uniform flows on the whole arc of 360° and on the different levels where the flows are developing; and (d) to get indirect heating of the reactor for ex. by means of steam, without any danger of scaling by solid matters on the heated surfaces and hence maintaining a good heat exchange coefficient, thanks to the turbulence and to the flows formed.

BRIEF DESCRIPTION OF THE DRAWING

The present invention will be further described by way of the accompanying drawing in which:

FIG. 3 is a sectional view substantially along the line III—III of FIG. 2.

FIG. 4 is a plan view of an alternative shape of the impeller of the rotor.

FIG. 5 represents schematically the currents inside the reactor.

DETAILED DESCRIPTION OF THE INVENTION

Figure 1:
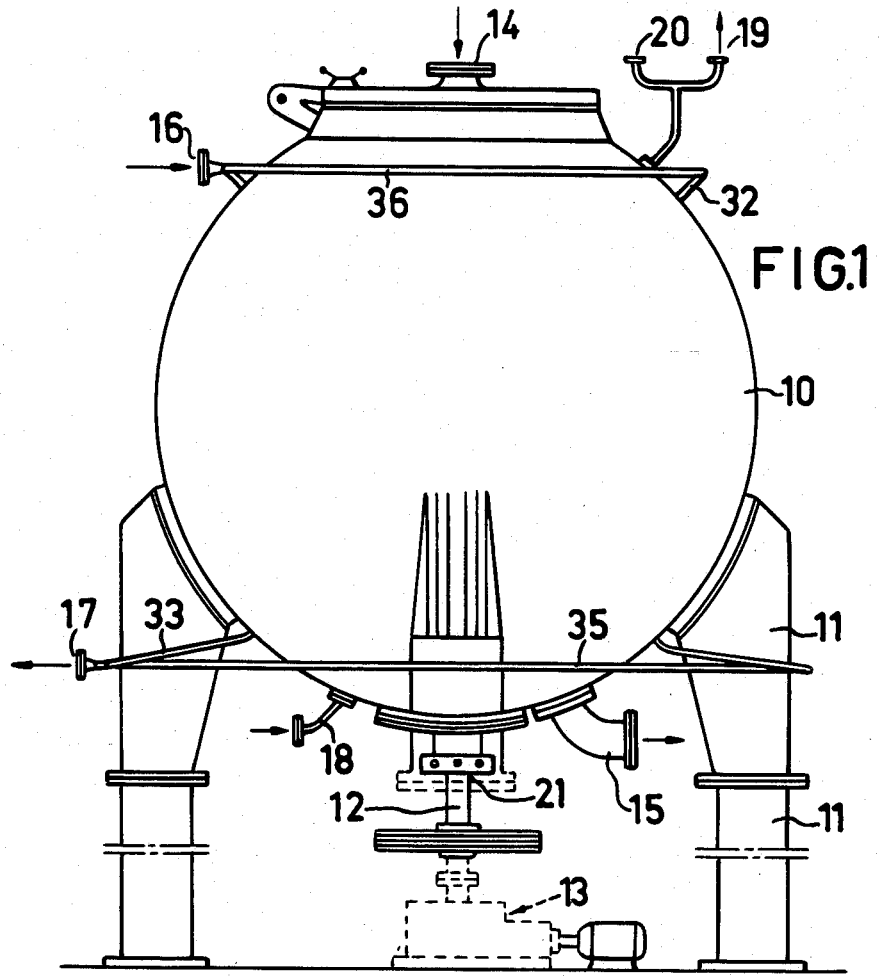
FIG. 1 is a lateral view of a reactor according to one embodiment of the invention.

Referring to the drawing and initially to FIG. 1, the reactor is essentially formed by a spherical body 10 which may have for example a diameter up to 10 m.

(500 cu.m of useful volume) supported by vertical rods 11.

A shaft 12 is disposed in the lower part of the container 10 and extends outside through an adequate stuffing box controlling the rotation of the rotor.

This shaft 12 may be driven through a control group 13 by means of a belt transmission, gear reducer or gearmotor. A gear motor is preferred when a strong mechanical action is required for the size reduction of the suspended material requiring high power absorption with a power demand up to 1000 kw.

The material to be treated is charged into the container or reactor 10 through the charging opening 14 preferably arranged on the upper part, whilst the discharge is made through the outlet 15 connected to the bottom of the container. This procedure of feeding and discharging the material is used when the equipment operates in batch or is the first one of a series for continuous operating.

However, in case of continuous operating or for special applications, the flow may be inverted by feeding through the connection 15 and discharging through the connection 14.

As indicated, the reactor is preferentially heated indirectly by means of a heating fluid, generally steam, which enters in 16 and exits preferably as condensate at 17, after having been put in contact with heat exchanging surfaces or elements, as can be seen better in the following. Liquid or gaseous chemicals are admitted through the corresponding connection 18, whilst the gases produced by the reaction are discharged at 19, preferably under the control of a pressure regulator and analysis of samples of the discharged gases. Eventual safety and control devices, normally required for pressurized vessels, as for ex. manometers and safety valves, may be installed at the offtake 20.

Figure 2:
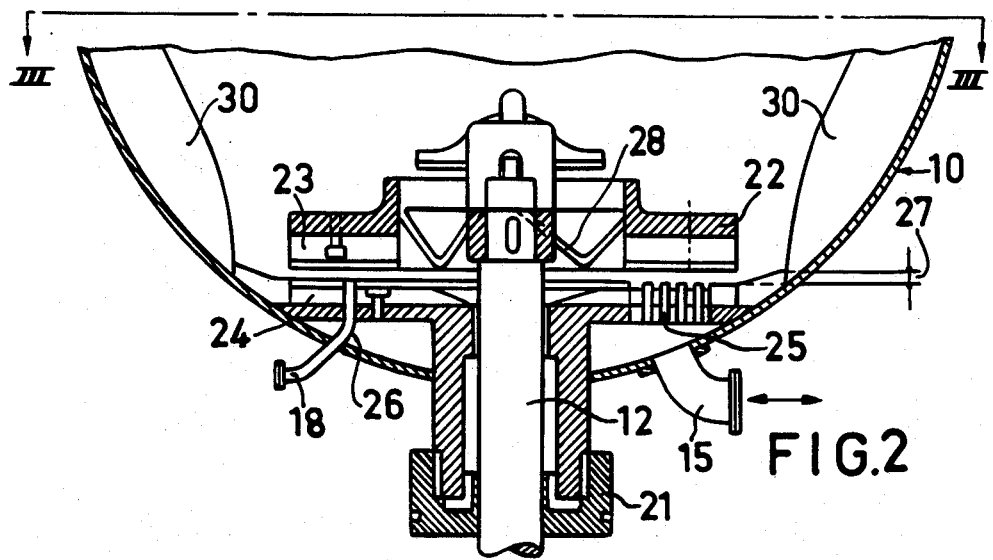
FIG. 2 is a partial sectional view following to a plane passing through the vertical shaft of the reactor and illustrating the parts of the rotor.

The internal portion of the reactor container 10 in the zone of the turbulence formation is illustrated in detail in FIGS. 2, 3 and 4. They show how the shaft 12 entering the reactor through the stuffing box 21, carries the rotor 22 and the rotating disc or ring 23 fixed thereto which cooperates with the lower stationary disc 24 with a perforated zone 25 through which the material to be treated or the treated material leave or enter by way of the connection 15. The disc 24 and the defibrating discs fixed thereto are crossed by the duct 26 connected to the inlet 18 permitting admission of liquid and/or gaseous reagents into the mixing and laminating zone 27 between the discs 24 and 23. The gap of this zone 27 or interspace between the static disc 24 and the rotating disc 23 can be varied with the machine working to better adjust it to the desired mechanical treatment to be performed. For the same reasons and depending on the material treated, the surfaces of the discs 23 and 24 may assume different structure characteristics as for example, blades, stakes, abrasive surfaces or the like.

The rotor 22 and the defibrating disc 23 are structured as an impeller of a helico-centrifugal pump with axial admission and radial delivery. Indeed in the central part, the spokes 28 which bring the disc into rotation are profiled as a section of a screw for suspensions at higher consistencies and low speed of rotation (10–200 R.P.M.) or a proper propeller in case of suspensions at lower consistencies and higher speed of rotation (200–1500 r.p.m.).

The centrifugal part of the pump is formed by the surfaces of the rotating disc 23 and the corresponding channels between the aforementioned blades, stakes or abrasive surfaces.

The rotor 22 with disc 23 may be substituted by an open agitator of the type shown at 29 in FIG. 4, especially when the treatment does not require an energy consuming action of defibration or disintegration.

The action of the impeller or helico-centrifugal pump causes, in cooperation with proper baffles 30, circulation of the treated mass of the type shown in FIG. 5, where it may clearly be seen that the suspension, guided by the baffles 30, radially leaves the pump and moves towards the top following the shape of the spherical wall and then concentrates at the top from where it falls down forming a central column 31.

It has thus been shown that the apparatus is of particular efficiency to achieve the desired object mentioned herein. Furthermore it was possible to heat indirectly the suspension during the treatment by letting the heating fluid through connections 32 (FIG. 1 and 3) into the space defined by the baffles 30 between their surface and the wall of the reactor's shell; space which consequently is not in contact with the suspension during the treatment. The steam circulating inside the baffles 30 is discharged through connections 33 (FIG. 1) and heats to the desired temperature the external surface 34 (FIG. 3) of said baffles, the number and shape of which may vary depending upon the quantity of heat to be transmitted to the suspension. On the outside, the baffles are contacted at high speed by the suspension pushed by the helico-centrifugal rotor, creating the conditions for a good heat exchange which is maintained during the operation because scaling and deposits on the surface 34 are avoided. The heating fluid or steam condensate are recovered through a distribution ring 35 (FIG. 1) and then passed through a heat source and again sent back in a closed cycle to the upper distribution ring 36.

Figure 6:
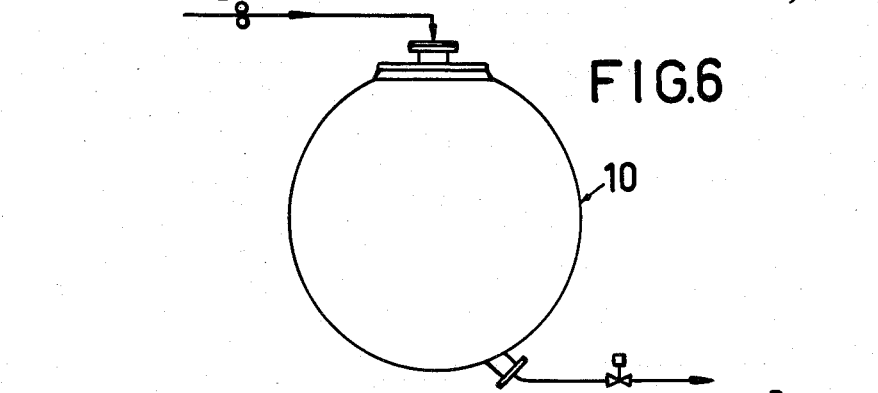
FIGS. 6, 7 and 8 are schematic illustrations of the use of the reactor according to the invention.
Figure 7:
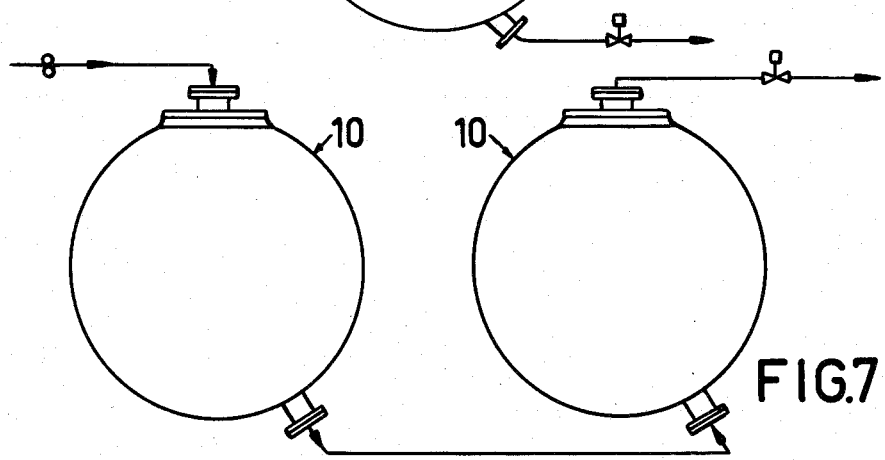
Figure 8:
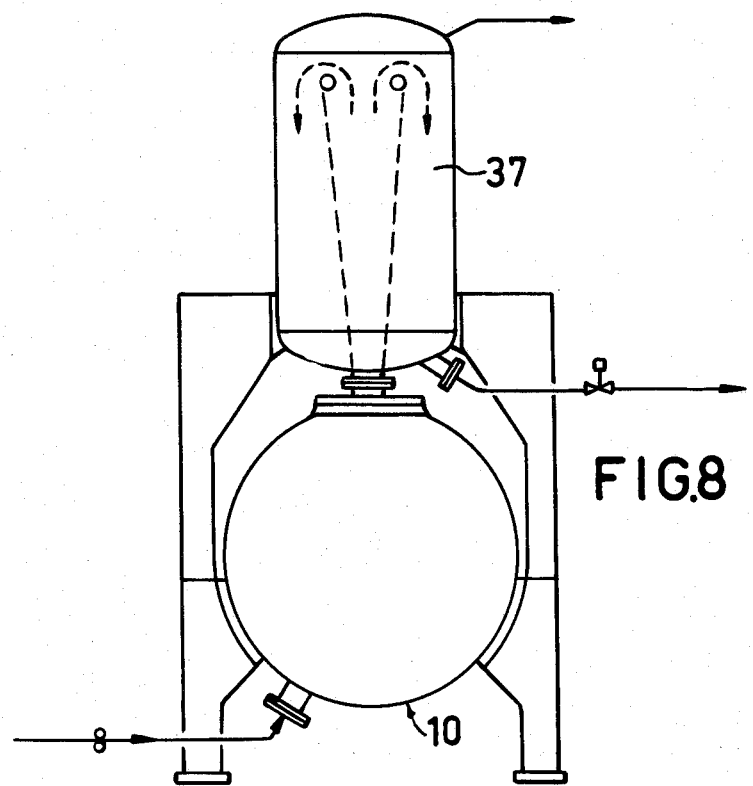

The reactor herein described and called "TURBOPULPER" can be used for batch operations as shown schematically in FIG. 6 or in continuous operations by putting in series two or more reactors of the same type (FIG. 7). The turbopulper could also be used for continuous operations, where a homogeneous distribution of reagents and $O_2$ is achieved, size reduction of the suspended material and heating to the reaction temperature is obtained, whilst the necessary retention time for the complete development of the reaction is obtained in another static container 37 of an essentially conventional type, also this pressurized and of suitable shape, in series with the turbopulper.

When the apparatus is used, as in the preferred case, to achieve optimum conditions for a delignification treatment (cook) following the alkali-oxygen process, it overcomes the mentioned difficulties of the known treatments, represented particularly by the indirect heating of a cellulose-fibres (from wood or short cycle vegetables, straw, etc) suspension in a liquid, achieving a progressive size reduction of chips or fibre bundles from wood or annual plants with an increase of the total contact surface.

The apparatus performs also a perfect distribution and intimate mixing of the reagents with the fibres in suspension. Moreover, in the case of the mentioned treatment, yields and activates the quantity of the oxygen required for the delignification of the fibrous material, overcoming the problem of the low solubility of oxygen in water and particularly at the temperatures required to obtain the delignification (100°–180° C.).

The capacity of the apparatus to distribute gas in liquid, creates a solution within the permitted limits of the equilibrium conditions and at the same time produces an emulsion of gas in the liquid medium, thus giving rise to a continuous contact and replacement of $O_2$ on the surface of the single fibres or bundles, which must be delignified.

As indicated herein, the reaction is eased by a simultantous mechanical defibration of the fibres. The reactions are speeded up by the simultaneous indirect heating.

The turbopulper operates at consistencies of the fibre suspension between 3% and 15% depending on the type of material in suspension and on the quantity of liquid necessary to contain the required quantity of $O_2$ as a solution-emulsion for the delignification.

The quantity of active $O_2$ in a liquid solution-emulsion, may reach 10% of the dry cellulosic fibres contained in the reactor. The volume of the apparatus or of each one in the case of operating in series, is chosen so as to achieve reaction times which may vary between 30 minutes and 3 hours.

The heating medium (generally steam) has characteristics which permit the heating up to temperatures which may vary between 60° C. and 180° C. The turbopulper is tested for working pressures up to 20 bar.

The pressure naturally depends from the performance required by the apparatus and is the equivalent of the partial gas ($O_2$) pressure plus that of the vapour at the corresponding working temperatures.

I claim:

1. Apparatus for reacting a solution of cellulosic pulp material under intimate and turbulent contact with a chemical composition while simultaneously subjecting the pulp material to a disintegrating treatment, said apparatus comprising:
   (a) a stationary pressure-sealed substantially spherical reactor vessel in which the pulp material is received and treated under conditions of elevated pressure and temperature, said reactor vessel having a top portion and a bottom portion for admitting the material to be treated and for discharging the treated material, respectively;
   (b) a rotor member mounted to rotate within said reactor vessel adjacent said bottom portion, about a substantially vertical axis;
   (c) a stator disc in said bottom portion spaced from and facing said rotor member to define a disintegrating area therebetween;
   (d) a helico-centrifugal pump connected with said rotor member for conducting said pulp material axially into said disintegrating area by the aspirational effect generated by the rotation of said rotor and simultaneously generating an impeller action effective to eject the pulp material radially outwards from said disintegrating area and thence in a generally upward direction in turbulent flow within the confines of the walls of said spherical reactor vessel with consequent enhancement of the disintegrating action;
   (e) means for injecting said chemical composition into said disintegrating area; and
   (f) baffle elements extending along the walls of said reactor vessel for indirectly heating said pulp material while it is being treated in said reactor vessel.

2. Apparatus according to claim 1, in which said baffles have a substantially V-shaped section with vertex facing inwardly into said reactor vessel.

3. Apparatus according to claims 1, or 2, in which said rotor member and said stator member are provided with cooperating shearing elements for enhancing the disintegrating action.

4. Apparatus according to claim 1, in which said rotor member and said stator member are relatively adjustable to vary the width of said disintegrating zone.

5. Apparatus according to claim 1, in which said reactor vessel is constructed to withstand an internal absolute pressure of 20 bars and a temperature of 180° C.

* * * * *